United States Patent
Albertus et al.

(10) Patent No.: US 9,478,836 B2
(45) Date of Patent: Oct. 25, 2016

(54) METAL/AIR BATTERY WITH ELECTROCHEMICAL OXYGEN COMPRESSION

(71) Applicant: Robert Bosch GmbH, Stuttgart (DE)

(72) Inventors: Paul S. Albertus, Mountain View, CA (US); John F. Christensen, Mountain View, CA (US); Timm Lohmann, Mountain View, CA (US); Roel S. Sanchez-Carrera, Sommerville, MA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 13/926,641

(22) Filed: Jun. 25, 2013

(65) Prior Publication Data

US 2013/0344401 A1    Dec. 26, 2013

Related U.S. Application Data

(60) Provisional application No. 61/664,059, filed on Jun. 25, 2012.

(51) Int. Cl.
*H01M 8/22* (2006.01)
*H01M 12/08* (2006.01)
*H01M 8/04* (2016.01)

(52) U.S. Cl.
CPC ......... *H01M 12/08* (2013.01); *H01M 8/04089* (2013.01); *H01M 8/04201* (2013.01)

(58) Field of Classification Search
CPC .................. H01M 12/08; H01M 2004/8689; H01M 4/88; Y02E 60/50
See application file for complete search history.

(56) References Cited

U.S. PATENT DOCUMENTS

| | | | |
|---|---|---|---|
| 4,828,940 A * | 5/1989 | Cohen et al. ................ 429/425 |
| 2005/0175894 A1 * | 8/2005 | Visco et al. ................. 429/212 |
| 2007/0151983 A1 * | 7/2007 | Patel et al. ..................... 222/95 |
| 2012/0041628 A1 | 2/2012 | Hermann et al. | |

FOREIGN PATENT DOCUMENTS

| | | | | |
|---|---|---|---|---|
| JP | 04154054 A | * | 5/1992 | ............ H01M 12/06 |
| JP | 04154054 A | * | 5/1992 | ............ H01M 12/06 |

OTHER PUBLICATIONS

Partial International Search Report corresponding to PCT Application No. PCT/US2013/047654, mailed Oct. 9, 2013 (10 pages).
Abraham et al., "A Polymer Electrolyte-Based Rechargeable Lithium/Oxygen Battery", Journal of the Electrochemical Society; 1996; pp. 1-5; vol. 143, No. 1; Norwood, USA (5 pages).

(Continued)

*Primary Examiner* — Patrick Ryan
*Assistant Examiner* — Ben Lewis
(74) *Attorney, Agent, or Firm* — Maginot Moore & Beck LLP

(57) ABSTRACT

A metal/air battery in one embodiment includes a negative electrode, a positive electrode, and a separator positioned between the negative electrode and the positive electrode, wherein the pressure within the positive electrode is maintained at or above 10 bar with compression energy provided by electrons driving electrochemical reaction in the battery during charging of the metal/air battery.

20 Claims, 4 Drawing Sheets

(56) References Cited

OTHER PUBLICATIONS

Amatucci et al., "Flouride based electrode materials for advanced energy storage devices", Journal of Flourine Chemistry; 2007; pp. 243-262; vol. 128, No. 4; Elsevier Publishing; North Brunswick, USA (20 pages).

Beattie et al., "High-capacity lithium-air cathodes", Journal of the Electrochemical Society; 2009; vol. 156; Canada (13 pages).

Cabana et al, "Beyond Intercalation-Based Li-Ion Batteries: The State of the Art and Challenges of Electrode Materials Reacting Through Conversion Reactions", Advanced Materials; 2010; pp. E170-E192; vol. 22, Issue 35; Wiley-Vch Verlag GmbH; Europe.

Christensen et al., "A Critical Review of Li/Air Batteries", Journal of the Electrochemical Society; 2012; pp. R1-R30; vol. 159, No. 2; USA (30 pages).

Hutchings et al., "Electrochemical oxygen separation and compression using planar, cosintered ceramics", Solid State Ionics; 2008; pp. 442-450; vol. 179, No. 11; Elsevier Publishing; USA (9 pages).

Kumar et al., "A Solid-State, Rechargeable, Long Cycle Life Lithium-Air Battery", Journal of the Electrochemical Society; 2010; pp. A50-A54; vol. 157, Issue 1; USA (5 pages).

Ogasawara et al., "Rechargeable $Li2O2$ Electrode for Lithium Batteries", Journal of the American Chemical Society; 2006; pp. 1390-1393; vol. 128, No. 4; Europe (4 pages).

Read, "Characterization of the Lithium/Oxygen Organic Electrolyte Battery", Journal of the Electrochemical Society; 2002; pp. A1190-A1195; vol. 149; Adelphi, USA (6 pages).

Read et al, "Oxygen Transport Properties of Organic Electrolytes and Performance of Lithium/Oxygen Battery", Journal of the Electrochemical Society; 2003; pp. A1351-A1356; vol. 150; Adelphi, USA (6 pages).

Strobel et al., "The compression of hydrogen in an electrochemical cell based on a PE fuel cell design", Journal of Power Sources; 2002; pp. 208-215; vol. 105, No. 2; Elsevier Publishing; Germany (8 pages).

USABC, "USABC Goals for Advanced Batteries for EVs", United States Advanced Battery Consortium; 2002 (1 page).

Yang et al., "The effect of oxygen pressures on the electrochemical profile of lithium/oxygen battery", Journal of Solid State Electrochemistry; 2010; pp. 109-114; vol. 14; Shanghai, China (6 pages).

Zheng et al., "Theoretical Energy Density of Li-Air Batteries", Journal of the Electrochemical Society; 2008; pp. A432-A437; vol. 155, No. 6; USA (6 pages).

\* cited by examiner

METAL/AIR BATTERY WITH ELECTROCHEMICAL OXYGEN COMPRESSION

This application claims the benefit of U.S. Provisional Application No. 61/664,059, filed on Jun. 25, 2012, the entire contents of which are herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}CO_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/oxygen cells have been demonstrated in controlled laboratory environments, a number of issues remain before full commercial introduction of a lithium/oxygen cell is viable as discussed further below.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54 while filtering undesired components such as gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

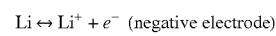

$Li \leftrightarrow Li^+ + e^-$ (negative electrode)

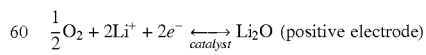

$\frac{1}{2}O_2 + 2Li^+ + 2e^- \xleftrightarrow{catalyst} Li_2O$ (positive electrode)

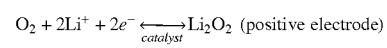

$O_2 + 2Li^+ + 2e^- \xleftrightarrow{catalyst} Li_2O_2$ (positive electrode)

The positive electrode 54 in a typical cell 50 is a lightweight, electrically conductive material which has a porosity of greater than 80% to allow the formation and deposition/ storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm must have a capacity of about 20 mAh/cm².

Materials which provide the needed porosity include carbon black, graphite, carbon fibers, carbon nanotubes, and other non-carbon materials. There is evidence that each of these carbon structures undergo an oxidation process during charging of the cell, due at least in part to the harsh environment in the cell (pure oxygen, superoxide and peroxide ions, formation of solid lithium peroxide on the cathode surface, and electrochemical oxidation potentials of >3V (vs. $Li/Li^+$)).

A number of investigations into the problems associated with Li-oxygen batteries have been conducted as reported, for example, by Beattie, S., D. Manolescu, and S. Blair, "High-Capacity Lithium—Air Cathodes," *Journal of the Electrochemical Society*, 2009. 156: p. A44, Kumar, B., et al., "A Solid-State, Rechargeable, Long Cycle Life Lithium—Air Battery," *Journal of the Electrochemical Society*, 2010. 157: p. A50, Read, J., "Characterization of the lithium/oxygen organic electrolyte battery," *Journal of the Electrochemical Society*, 2002. 149: p. A1190, Read, J., et al., "Oxygen transport properties of organic electrolytes and performance of lithium/oxygen battery," *Journal of the Electrochemical Society*, 2003. 150: p. A1351, Yang, X and Y. Xia, "The effect of oxygen pressures on the electrochemical profile of lithium/oxygen battery," *Journal of Solid State Electrochemistry*: p. 1-6, and Ogasawara, T., et al., "Rechargeable $Li_2O_2$ Electrode for Lithium Batteries," *Journal of the American Chemical Society*, 2006. 128(4): p. 1390-1393.

While some issues have been investigated, several challenges remain to be addressed for lithium-oxygen batteries. These challenges include limiting dendrite formation at the lithium metal surface, protecting the lithium metal (and possibly other materials) from moisture and other potentially harmful components of air (if the oxygen is obtained from the air), designing a system that achieves acceptable specific energy and specific power levels, reducing the hysteresis between the charge and discharge voltages (which limits the round-trip energy efficiency), and improving the number of cycles over which the system can be cycled reversibly.

The limit of round trip efficiency occurs due to an apparent voltage hysteresis as depicted in FIG. 4. In FIG. 4, the discharge voltage 70 (approximately 2.5 to 3 V vs. $Li/Li^+$) is much lower than the charge voltage 72 (approximately 4 to 4.5 V vs. Li/Li). The equilibrium voltage 74 (or open-circuit potential) of the lithium/oxygen system is approximately 3 V. Hence, the voltage hysteresis is not only large, but also very asymmetric.

The large over-potential during charge may be due to a number of causes. For example, reaction between the $Li_2O_2$ and the conducting matrix 62 may form an insulating film between the two materials. Additionally, there may be poor contact between the solid discharge products $Li_2O_2$ or $Li_2O$ and the electronically conducting matrix 62 of the positive electrode 54. Poor contact may result from oxidation of the discharge product directly adjacent to the conducting matrix 62 during charge, leaving a gap between the solid discharge product and the matrix 52.

Another mechanism resulting in poor contact between the solid discharge product and the matrix 62 is complete disconnection of the solid discharge product from the conducting matrix 62. Complete disconnection of the solid discharge product from the conducting matrix 62 may result from fracturing, flaking, or movement of solid discharge product particles due to mechanical stresses that are generated during charge/discharge of the cell. Complete disconnection may contribute to the capacity decay observed for most lithium/oxygen cells. By way of example, FIG. 5 depicts the discharge capacity of a typical Li/oxygen cell over a period of charge/discharge cycles.

Other physical processes which cause voltage drops within an electrochemical cell, and thereby lower energy efficiency and power output, include mass-transfer limitations at high current densities. The transport properties of aqueous electrolytes are typically better than nonaqueous electrolytes, but in each case mass-transport effects can limit the thickness of the various regions within the cell, including the cathode. Reactions among $O_2$ and other metals may also be carried out in various media.

What is needed therefore is a metal/oxygen battery that uses the electrochemical compression having a dedicated oxygen reservoir (such as a tank), but avoids the cost, complexity, and loss of energy efficiency associated with the use of an external, mechanical oxygen compressor.

SUMMARY

In one embodiment, a metal/air battery includes a negative electrode, a positive electrode, and a separator positioned between the negative electrode and the positive electrode, wherein the pressure within the positive electrode is maintained at or above 10 bar with compression energy provided by electrons driving electrochemical reaction in the battery during charging of the metal/air battery.

In another embodiment, a metal/air battery includes a negative electrode, a positive electrode, a separator positioned between the negative electrode and the positive electrode, and a fixed amount of oxygen within the battery, wherein the pressure within the positive electrode is maintained at or above 10 bar with compression energy provided by electrons driving electrochemical reaction in the battery during charging of the metal/air battery.

In yet another embodiment, a metal/air battery includes a negative electrode, a positive electrode, and a separator positioned between the negative electrode and the positive electrode; wherein the batter is sealed such that oxygen does not enter or exit the battery during normal operation of the battery, and wherein the pressure within the positive electrode is maintained at or above 10 bar with compression energy provided by electrons driving electrochemical reaction in the battery during charging of the metal/air battery.

DETAILED DESCRIPTION

Figure 6:
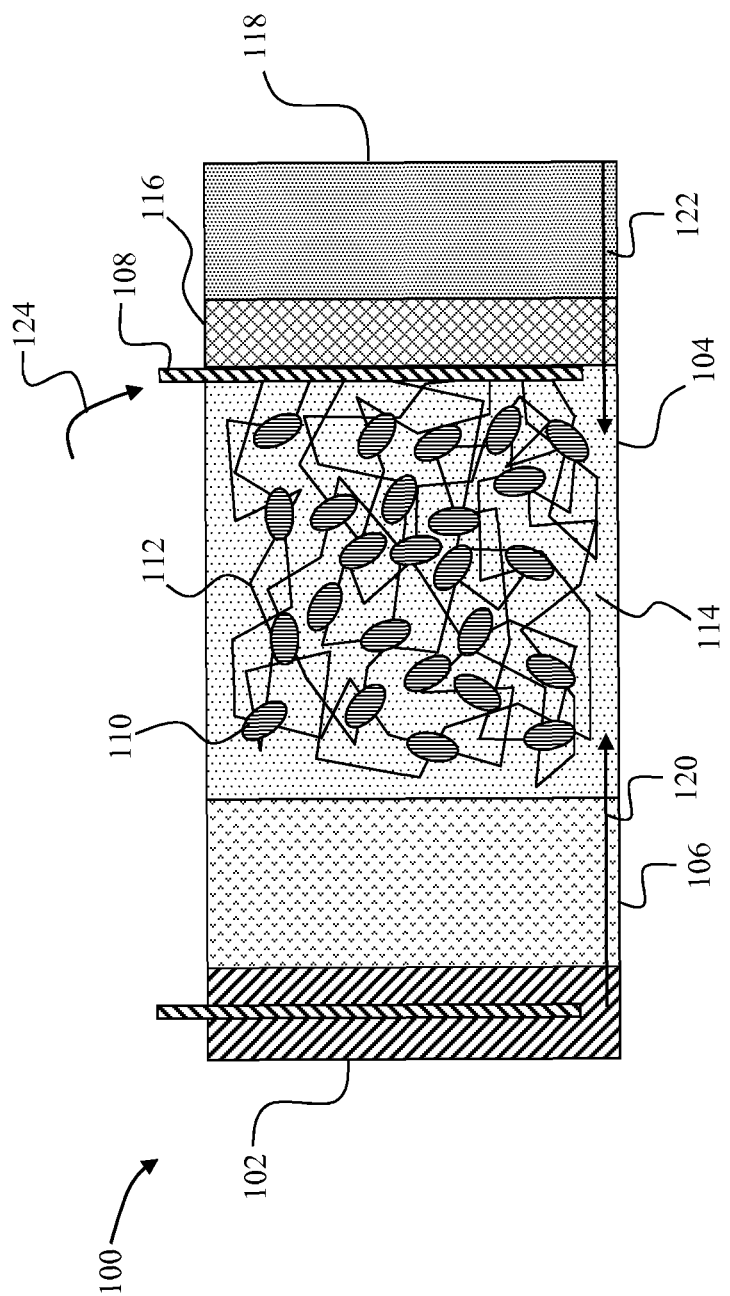
FIG. 6 depicts a schematic view of a lithium-oxygen (Li/oxygen) cell with two electrodes and a reservoir configured to exchange oxygen with a positive electrode for a reversible reaction with lithium.

A schematic of an electrochemical cell 100 is shown in FIG. 6. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes. Other metals may also be used to form the negative electrode, such as Zn, Mg, Na, Fe, Al, Ca, Si, and others.

The positive electrode 104 in this embodiment includes a current collector 108 and electrode particles 110, optionally covered in a catalyst material, suspended in a porous matrix 112. The porous matrix 112 is an electrically conductive matrix formed from a conductive material such as conductive carbon or a nickel foam, although various alternative matrix structures and materials may be used. The separator 106 prevents the negative electrode 102 from electrically connecting with the positive electrode 104.

Figure 4:
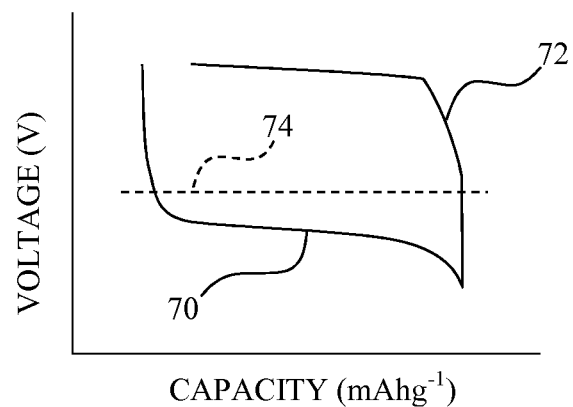
FIG. 4 depicts a discharge and charge curve for a typical Li/oxygen electrochemical cell.
Figure 5:
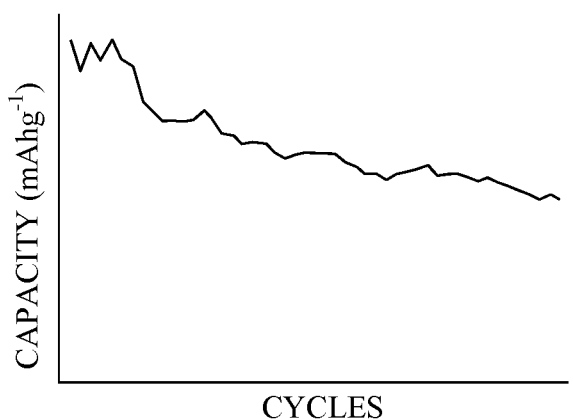
FIG. 5 depicts a plot showing decay of the discharge capacity for a typical Li/oxygen electrochemical cell over a number of cycles.

The electrochemical cell 100 includes an electrolyte solution 114 present in the positive electrode 104 and in some embodiments in the separator 106. In the exemplary embodiment of FIG. 4, the electrolyte solution 114 includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate.

A barrier 116 separates the positive electrode 104 from a reservoir 118. The reservoir 118 may be any vessel suitable to hold oxygen supplied to and emitted by the positive electrode 104. While the reservoir 118 is shown as an integral member of the electrochemical cell 100 attached to the positive electrode 104, in one embodiment the reservoir 118 is the positive electrode 104 itself. Various embodiments of the reservoir 118 are envisioned, including rigid tanks, inflatable bladders, and the like. In FIG. 6, the barrier 116 is a mesh which permits oxygen and other gases to flow between the positive electrode 104 and the reservoir 118 while also preventing the electrolyte 114 from leaving the positive electrode 104. Alternatively, the retention of cell components such as volatile electrolyte, may be carried out separately from the individual cells, such that the barrier 116 is not required.

In the case in which the metal is Li, the electrochemical cell 100 discharges with lithium metal in the negative electrode 102 ionizing into a $Li^+$ ion with a free electron $e^-$. $Li^+$ ions travel through the separator 106 in the direction indicated by arrow 120 toward the positive electrode 104. Oxygen is supplied from the reservoir 118 through the barrier 116 as indicated by the arrow 122. Free electrons $e^-$ flow into the positive electrode 104 through the current collector 108 as indicated by arrow 124.

The oxygen atoms and $Li^+$ ions within the positive electrode 102 form a discharge product 130 inside the positive electrode 104, aided by the optional catalyst material on the electrode particles 110. As seen in the following equations, during the discharge process metallic lithium is ionized, combining with oxygen and free electrons to form $Li_2O_2$ or $Li_2O$ discharge product that may coat the surfaces of the carbon particles 110.

$Li \rightarrow Li^+ + e^-$ (negative electrode)

$\frac{1}{2}O_2 + 2Li^+ + 2e^- \xrightarrow{catalyst} Li_2O$ (positive electrode)

$O_2 + 2Li^+ + 2e^- \xrightarrow{catalyst} Li_2O_2$ (positive electrode)

Figure 1:
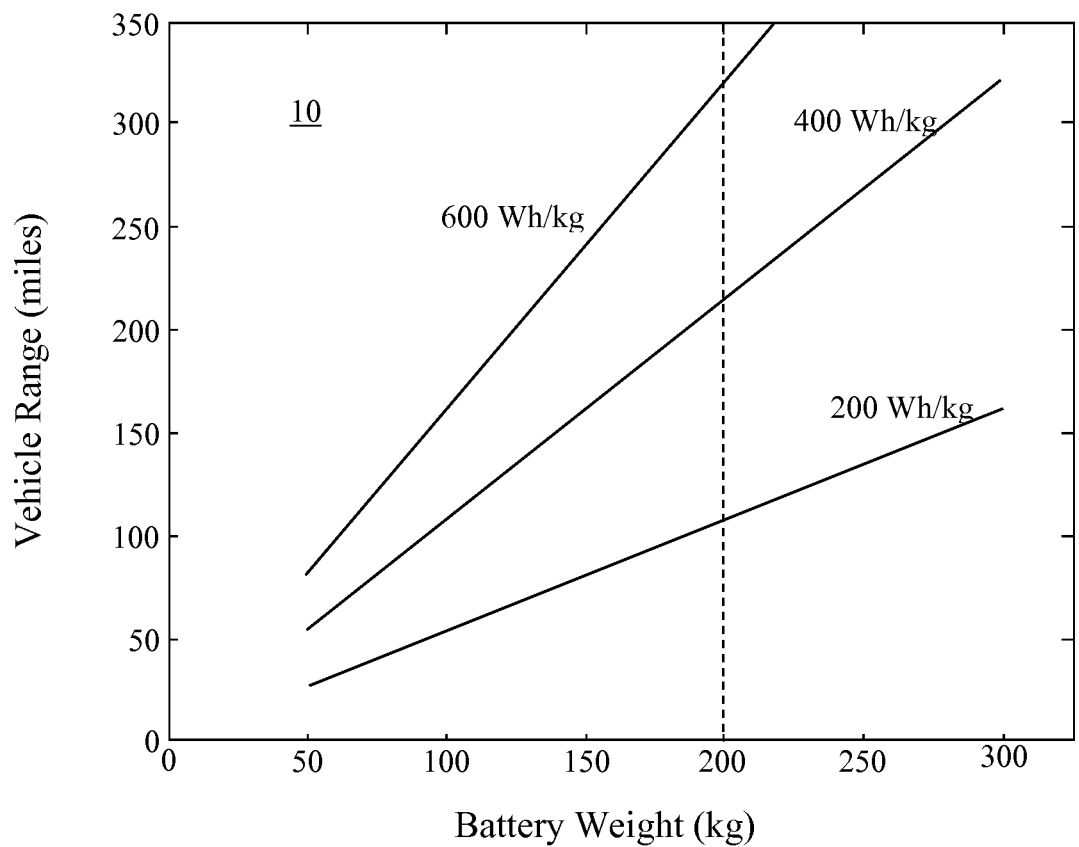
FIG. 1 depicts a plot showing the relationship between battery weight and vehicular range for various specific energies.
Figure 2:
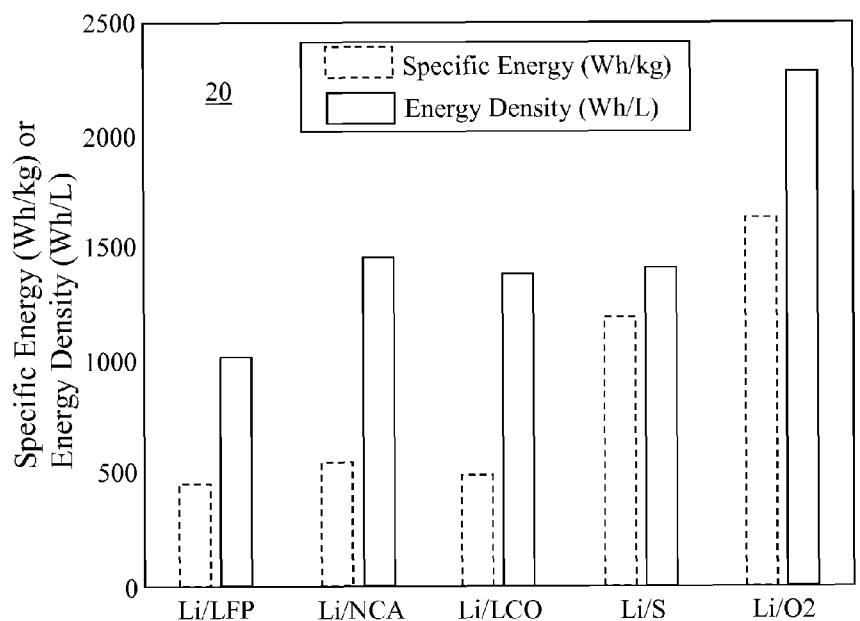
FIG. 2 depicts a chart of the specific energy and energy density of various lithium-based cells.
Figure 3:
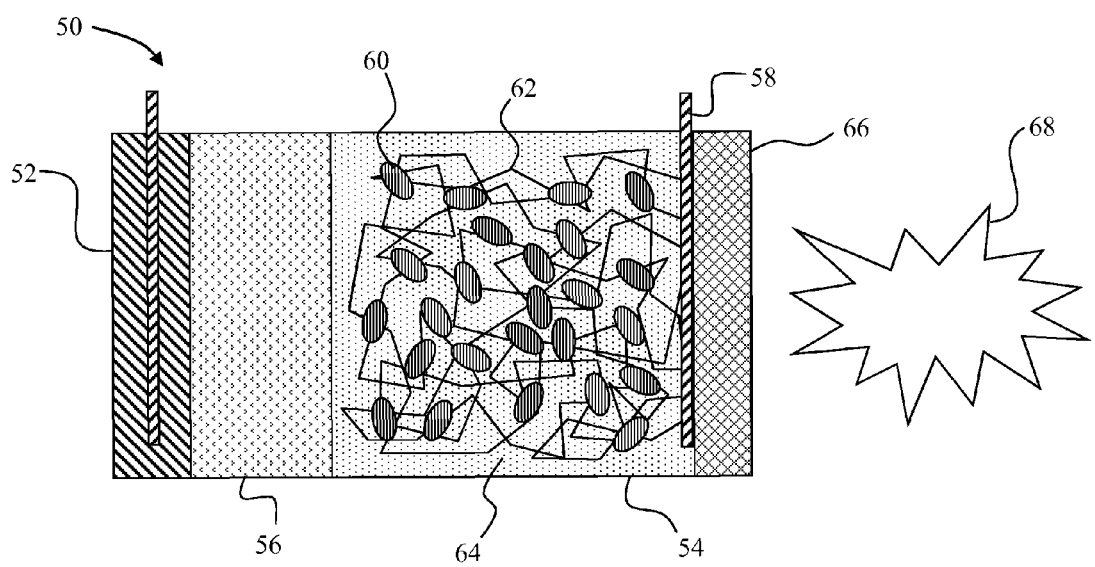
FIG. 3 depicts a prior art lithium-oxygen (Li/oxygen) cell including two electrodes, a separator, and an electrolyte.

In contrast with the system of FIG. 3, the electrochemical cell 100 does not use air as an external source for oxygen. External sources, such as the atmosphere, include undesired gases and contaminants. Thus, while the oxygen that reacts electrochemically with the metal in a metal/oxygen battery may come from the air, the presence of $CO_2$ and $H_2O$ in air make it an unsuitable source for some of the media in which the metal/oxygen reactions are carried out and for some of the products that form. For example, in the reaction of Li with oxygen in which $Li_2O_2$ is formed, $H_2O$ and $CO_2$ can react with the $Li_2O_2$ to form LiOH and/or $Li_2CO_3$, which can deleteriously affect the performance and rechargeability of the battery. As another example, in a basic medium $CO_2$ can react and form carbonates that precipitate out of solution and cause electrode clogging.

In contrast to obtaining oxygen from ambient air, the electrochemical cell 100 stores oxygen within the cell or in a tank that is part of the battery system. In order to eliminate the need for an external compressor, and to capture as much of the energy that is required for the compression as possible during discharge, the electrochemical cell 100 uses electrochemical compression. Unlike electrochemical compression of hydrogen, in which a proton-conducting membrane is typically used, in the electrochemical cell 100 no oxygen-conducting membrane is required; rather, the oxygen is simply evolved from the metal/oxygen compound during charge, and consumed during discharge.

Storage of oxygen in a tank or within a cell adds mass and volume to the battery, but in some circumstances may be justified, for example in the case of a Li/oxygen battery in which a very high specific energy and energy density may be obtained even with the use of stored oxygen. In order to minimize the size and facilitate a modular design of the electrochemical cell 100 while providing for oxygen storage, in some embodiments the oxygen within the electrochemical cell 100 is stored within the positive electrode 118.

Electrochemical compression of oxygen to elevated pressures, such as to a pressure of 10 bar or higher, including to a pressure of 350 bar or higher, significantly reduces the volume of the stored oxygen. In embodiments wherein the oxygen is stored within the cell, the electrochemical cell 100 is designed so that oxygen does not leak out of the cell at 10 bar or higher, including to a pressure of 350 bar or higher. Additionally, the electrochemical cell 100 or stack components are provided with sufficient mechanical strength to not undergo fracture or cycling fatigue. In particular, flow fields that limit the deformation of the cell sandwich, and seals that prevent oxygen egress at elevated pressures, are incorporated. In addition, the separator 106 limits the amount of crossover of $O_2$ to the metal electrode where it would react chemically and thereby not generate energy electrochemically. For example, for a Li/oxygen battery making use of electrochemical oxygen compression a ceramic protection layer on the Li metal can allow for the transport of Li but not oxygen, and is envisioned in some embodiments.

Electrochemical gas compression is accomplished when one or more products of an electrochemical reaction is a gas, and rather than the gas being withdrawn from the system (e.g., through ejection to the atmosphere), the gas is contained within the system such that its pressure builds up. The compression energy is provided directly by the electrons driving the electrochemical reaction. The gas may be stored within the electrochemical cell 100 in a designated compartment, in a tank that is separated from a stack, or in another volume within the system.

The electrochemical cell 100 thus makes use of oxygen (which may be pure or contain additional components) stored within a battery cell or external to a cell in a tank or other volume. The oxygen reacts electrochemically with the metal (which may include Li, Zn, Mg, Na, Fe, Al, Ca, Si, and others) to produce energy on discharge, and on charge the metal is regenerated and oxygen gas (and perhaps other species, such as $H_2O$) are evolved.

Beneficially, the electrochemical cell 100 is thus a completely closed system and species present in ambient air (e.g., $H_2O$, $CO_2$, and others) that may be detrimental to the cell operation are excluded. The electrochemical cell 100 provides electrochemical compression of oxygen on charge, and the use of compressed oxygen on discharge, to reduce energy losses associated with mechanical oxygen compression (which is typically carried out adiabatically, including in a multi-stage adiabatic process) and to reduce the cost and complexity of a mechanical compressor. The components of the electrochemical cell 100 are configured to handle the pressure of the compressed oxygen, including flow fields, bipolar plates, electrodes, separators, and high-pressure oxygen lines.

Beneficially, during discharge the compression energy is recovered in full or in part by operating of the battery at the storage pressure or a fraction of the storage pressure, or not recovered at all by operating the battery at a specified lower pressure. No external compressor is required to compress the gas on charge, as it is done electrochemically.

The electrochemical cell 100 in some embodiments includes high-pressure seals, an electrode, gas-diffusion layer, and flow field design that provide sufficient mechanical support to prevent pressure-induced fracture or bending (including with pressure cycling) that would be deleterious to cell performance and life, and a separator 106 that is impervious to oxygen (even at high pressures, including up to 350 bar or above). The minimum pressure in some embodiments is chosen to eliminate delamination of cell components from one another. The minimum pressure in some embodiments is chosen to reduce mass transfer limitations and thereby increase the limiting current.

Electrochemical compression may be carried out isothermally, reducing the compression work compared to adiabatic compression (including multi-stage adiabatic compression). By operating the cell at the same pressure as the stored oxygen, the compression work can, at an equilibrium rate, be completely recovered during the discharge process. This is important because the compression work can, depending on the pressure of the tank, constitute an appreciable amount of the energy contained within the reactants (i.e., 5% or more).

Advantageously, operating the electrochemical cell 100 at a pressure significantly above ambient, as is done in some embodiments, can help prevent delamination of the Li metal electrode from its protection layers. The high pressure can also reduce mass-transport limitations in the positive electrode and thereby increase the limiting current by increasing the chemical potential of oxygen. Thus, the amount of oxygen dissolved in the electrolyte and the driving force for oxygen transport to the reaction site is increased.

In various embodiments, oxygen is stored within a cell, allowing the creation of modular units that can be sized as desired and combined into larger systems of any desired size. In other embodiments, oxygen is stored in a volume outside of the individual cells, such as in a tank, an inflatable bladder, etc.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. A metal/air battery comprising:
   a negative electrode;
   a positive electrode; and
   a separator positioned between the negative electrode and the positive electrode, wherein the metal/air battery is configured to capture oxygen generated during a charging operation such that when the metal/air battery is in a fully charged state, the pressure within the positive electrode is at or above 10 bar with compression energy provided by electrons driving electrochemical reaction in the metal/air battery during charging of the metal/air battery.

2. The metal/air battery of claim 1, further comprising:
   a reservoir external to the positive electrode, the reservoir configured to store the oxygen generated during charging of the metal/air battery and to return the stored oxygen to the positive electrode during discharge.

3. The metal/air battery of claim 2, wherein the metal/air battery is configured for pressurization of at least 350 bar.

4. The metal/air battery of claim 1, wherein the separator is configured to inhibit movement of oxygen through the separator.

5. The metal/air battery of claim 4, wherein the separator includes a layer of ceramic material.

6. The metal/air battery of claim 1, further comprising:
   an inflatable bladder configured to receive the oxygen generated during charging of the metal/air battery and to return the received oxygen to the positive electrode during discharge.

7. The metal/air battery of claim 6, wherein the inflatable bladder is located within the positive electrode.

8. A metal/air battery comprising:
   a negative electrode;
   a positive electrode;
   a separator positioned between the negative electrode and the positive electrode; and
   a fixed amount of oxygen within the metal/air battery, wherein the metal/air battery is configured such that when the metal/air battery is in a fully charged state, pressure within the positive electrode is at or above 10 bar with compression energy provided by electrons driving electrochemical reaction in the metal/air battery during charging of the metal/air battery.

9. The metal/air battery of claim 8, further comprising:
   a reservoir external to the positive electrode, the reservoir configured to store oxygen generated during charging of the metal/air battery and to return the stored oxygen to the positive electrode during discharge.

10. The metal/air battery of claim 9, wherein the metal/air battery is configured for pressurization of at least 350 bar.

11. The metal/air battery of claim 8, wherein the separator is configured to inhibit movement of oxygen through the separator.

12. The metal/air battery of claim 11, wherein the separator includes a layer of ceramic material.

13. The metal/air battery of claim 8, further comprising:
an inflatable bladder configured to receive oxygen generated during charging of the metal/air battery and to return the generated oxygen to the positive electrode during discharge.

14. The metal/air battery of claim 13, wherein the inflatable bladder is located within the positive electrode.

15. A metal/air battery comprising:
a negative electrode;
a positive electrode; and
a separator positioned between the negative electrode and the positive electrode;
wherein the metal/air battery is sealed such that oxygen does not enter or exit the metal/air battery during normal operation of the metal/air battery, and wherein the metal/air battery is configured such that pressure within the positive electrode is at or above 10 bar when the metal/air battery is in a fully charged state with compression energy provided by electrons driving electrochemical reaction in the battery during charging of the metal/air battery.

16. The metal/air battery of claim 15, further comprising:
a reservoir external to the positive electrode, the reservoir configured to store oxygen generated during charging of the metal/air battery and to return the generated oxygen to the positive electrode during discharge.

17. The metal/air battery of claim 16, wherein the metal/air battery is configured for pressurization of at least 350 bar.

18. The metal/air battery of claim 15, wherein the separator is configured to inhibit movement of oxygen through the separator.

19. The metal/air battery of claim 18, wherein the separator includes a layer of ceramic material.

20. The metal/air battery of claim 15, further comprising:
an inflatable bladder configured to receive oxygen generated during charging of the metal/air battery and to return the generated oxygen to the positive electrode during discharge.

\* \* \* \* \*